3,738,950
POLYAMIDES MODIFIED WITH ADIPIC ACID AND PROCESS FOR THEIR PREPARATION

Robert J. Sturwold and Hubert J. Sharkey, Cincinnati, Ohio, assignors to Emery Industries, Inc., Cincinnati, Ohio
No Drawing. Filed June 14, 1971, Ser. No. 153,097
Int. Cl. C08g 20/20
U.S. Cl. 260—18 N    8 Claims

ABSTRACT OF THE DISCLOSURE

This invention relates to useful polymeric fat acid polyamide compositions modified with adipic acid and a method for their preparation. The adipic acid-modified polyamide resins are derived from polymeric fat acids and piperazine or piperazine derivatives and have an excellent balance of physical properties, softening point and adhesive properties making them suitable for hot melt bonding of vinyl-based substrates.

BACKGROUND OF THE INVENTION

Polyamides derived from polymeric fat acids are known and possess properties making them useful for adhesive applications with a wide variety of substrates, both as thermoplastic adhesives and heat-sealing adhesives. They are not generally acceptable for adhering vinyl-based materials, however. Only recently have polymeric fat acid polyamides been disclosed which provide good adhesion to vinyl-based polymer substrates. For example, U.S. Pat. No. 3,377,303 describes fat acid-derived polyamide compositions containing piperazine or dipiperidyl type diamines which are useful for hot melt bonding vinyls.

To be suitable as a hot melt for bonding plasticized vinyl resin, a polyamide must meet three requirements— it must have good adhesion to the vinyl, an acceptable softening point and good physical properties. It is especially difficult to obtain a good balance between softening point and physical properties of the resins and neither can be compromised. Excellent physical properties (tensile strength and elongation) are essential if the resin is to maintain its integrity under stress-strain conditions. Also, it should be pointed out that any adhesion obtained can be no better than the cohesive strength of the resin. The softening point of the resin should not be below about 125° C. if the resin is to find general usage in automotive applications and the like.

The simplest polyamide composition which could be envisioned as an adhesive for hot melt bonding vinyl materials would be one derived from a polymeric fat acid and piperazine or a dipiperidyl type diamine in view of the apparent desirability of these heterocyclic nitrogen compounds for obtaining enhanced adhesion. Such resins are not acceptable, however, since their softening points are below 100° C. Modification to increase the softening point without destroying or adversely affecting their physical properties and adhesive properties is necessary if useful resins are to be obtained.

Known methods for increasing the softening point include the addition of short chain diamines, short chain monobasic acids or short chain dibasic acids. When short chain diamines are added to the polymeric fat acid/piperazine resin there is no appreciable effect on the softening point, which remains in the range of 90–95° C. The use of short chain monobasic acids is undesirable since these serve as chain terminators and produce low molecular weight resins having low viscosity and poor physical properties.

Incorporating short chain dibasic acids containing from 2 to about 12 carbon atoms does not increase the softening point to an acceptable level unless large amounts are employed which is costly and markedly decreases the vinyl adhesion. With succinic acid the softening point is increased to about 115° C. which is marginal but the viscosity of the resulting polyamide is unacceptable.

When adipic acid, polymeric fat acid and piperazine are reacted in the conventional manner, large amounts of insoluble salts are obtained and the resin is unusable for commercial hot-melt applications since the salts clog the applicator machinery (tubing, nozzles, etc.) resulting in costly and time-consuming down time. Also, the resulting laminates are not smooth but have an undesirable pebbly appearance, especially when thin vinyl sheets are employed. Removal of the salts is impractical since filtration of the viscous resin mass is not possible without increasing the temperature of the resin to reduce the viscosity and increase the filterability. Increasing the temperature, however, leads to undesirable degradation of the polyamide resins in addition to being costly and time-consuming.

SUMMARY OF THE INVENTION

We have now quite unexpectedly found that adipic acid behaves in a unique manner and can be employed to modify polymeric fat acid-piperazine polyamide resins if a special reaction technique is employed to avoid the formation of insoluble salts. Even more unexpectedly we have found that the polyamide resins derived from polymeric fat acids and piperazine modified with adipic acid exhibit excellent adhesion for vinyl-based substrates and have excellent physical properties. Even more surprising is that these adipic acid-modified polyamide resins have softening points greater than 125° C, and often as high as 160° C. while polyamides modified with other closely related dibasic acids have softening points less than 100° C. and/or unacceptable viscosities. Only through the use of adipic acid can polymeric fat acid/piperazine resins having excellent physical properties, good adhesion for vinyl substrates and high softening points be obtained and useful materials of the type described can only be prepared by following the specific reaction procedure of our invention.

The present useful polyamide resins are obtained by the reaction of from 0.3 to 0.9 equivalent polymeric fat acid, 0.5 to 1.2 equivalent piperazine or piperazine derivative and 0.1 to 0.7 equivalent adipic acid. More preferably the compositions will contain 0.5 to 0.9 equivalent polymeric fat acid comprised of 90% by weight or higher dimer acids prepared from $C_{11}$ to $C_{22}$ monocarboxylic acids with 0.65 to 1 equivalent piperazine and 0.2 to 0.4 equivalent adipic acid. The resins are obtained by pre-reacting the piperazine with the fat acid before adding the adipic acid.

DETAILED DESCRIPTION

The improved polyamide compositions of the present invention are comprised of polymeric fat acids reacted with a piperazine compound and adipic acid. While the aforementioned compounds are essential components if polyamides suitable for hot-melt bonding of vinyl substrates are to be obtained, various other polybasic acids and polyamines may be present in limits amounts.

The polyamide resin compositions are comprised of from about 0.3 to 0.9 equivalent of polymeric fat acid containing from about 22 to 44 carbon atoms and, more preferably, will contain about 0.5 to 0.9 equivalent thereof. About 0.5 to about 1.2 equivalents piperazine compound can be employed, however, resins having excellent vinyl adhesive properties are obtained when about 0.65 to 1 equivalent piperazine are present. The adipic acid may range from about 0.1 to 0.7 equivalent and more preferably from about 0.2 to 0.4 equivalent. It is not essential that the same number of equivalents of amine and carboxyl be present, i.e., a balanced system, for acceptable resins to be obtained. It is within the scope of the present invention to employ off-balanced recipes where there is an excess (based on the calculated equivalents (of either amine or carboxyl functionality. In order to optimize the adhesive properties of the resin a slight equivalent excess of piperazine or piperazine derivative, up to about 0.2 equivalent, is often advantageous.

The polymeric fat acids employed for the invention may be prepared by polymerizing monocarboxylic acids containing from about 8 to 24 carbon atoms and, more preferably, from about 11 to 22 carbon atoms. Such processes for the polymerization of fatty acids are well-known to the art and any of these conventional polymerization processes utilizing natural clays as described in U.S. Pat. 2,347,562, alkaline clays such as described in U.S. Pat. 2,955,121 or acid clays such as described in U.S. Pats. 2,793,219, 2,793,220 and 3,157,681, and the like, may be employed and yield polymeric fat acids acceptable for the purposes of this invention.

It is desirable for the preparation of the present polyamide resins to use polymeric fat acids having a high dimer acid content, the dimer containing from about 22 to 44 carbon atoms. Typically, the fat acid employed will contain at least 65% by weight dimer acid, and more preferably, the dimer acid content will be at least 90% by weight of the total polymeric fat acid. The remainder of the fat acid composition will be primarily unpolymerized monomer acid and/or trimer acid. While the polymeric fat acid may be employed directly as it is obtained from the polymerizer it is sometimes advantageous, especially where a high dimer content polymeric fat acid is desired, to subject the polymerizate to a vacuum distillation or solvent extraction. In this manner dimer acid contents in excess of 90% by weight are obtained. If desired residual unsaturation may be removed by hydrogenating employing conventional procedures. Unsaturated and branched dimer acids do not interfere with the polyamide resin properties or with the process for obtaining same.

The piperazine compounds employed include piperazine and piperazine derivatives of the formula:

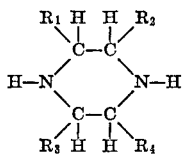

wherein $R_1$, $R_2$, $R_3$ and $R_4$ are independently selected from a group consisting of hydrogen and alkyl groups having from 1 to 4 carbon atoms. Typical piperazine derivatives are methyl piperazine, dimethyl piperazine, ethyl piperazine and the like. Piperazine is especially useful for the present invention to obtain resins having an excellent balance of physical properties and adhesive properties.

To obtain the useful fat acid-piperazine resins having excellent adhesion to vinyl substrates, a good balance physical properties and softening points greater than 125° C. it is necessary that at least about 0.1 equivalent adipic acid will be present.

Adipic acid, otherwise known as hexanedioic acid or 1,4-butanedicarboxylic acid, is unique for the purpose of this invention since other closely related homologous dibasic acids do not give resins acceptable for hot melt bonding vinyl substrates. Resins modified with oxalic acid, malonic acid, glutaric acid, azelaic acid, sebacic acid, brassylic acid, or dodecanedioic, for example, have softening points below 100° C. With succinic acid, the softening point of the resin produced is about 115° C. but the viscosity of the resin at 190° C. is only 9.2 which is low and outside what is considered to be the useful range for hot melt application. It is not necessary that the adipic acid be pure, however, large amounts of impurities such as homologous acids, monocarboxylic acids, or the like, should be avoided for best results.

Small amounts, not exceeding about 0.5 equivalent, of other amine- or carboxyl-containing compounds may generally be employed without adversely affecting the useful properties of the resin. For best results, however, the polymeric fat acid/piperazine/adipic acid resins will contain less than about 0.3 equivalent of such compounds. Compounds which may be employed if desired can be other aliphatic or aromatic dicarboxylic acids containing up to about 20 carbon atoms or monocarboxylic acids containing up to about 18 carbon atoms which may also serve as chain terminators. Aliphatic, cycloaliphatic, or aromatic diamines and their derivatives containing up to about 20 carbon atoms such as ethylenediamine, hexamethylenediamine, xylenediamine, bis(aminoethyl) benzene, methylene- or isopropylidine-biscyclohexylamine, 1,4-piperazine-bispropylamine and the like may be employed at these low levels. Also useful are dipiperidyl type diamines such as 1,3-di(4-piperidyl)propane, 1,4-di(4-piperidyl)butane and 1,2-di(4-piperidyl)ethane and N-substituted piperazine or dipiperidyl type diamines wherein the substituent consists of an aminoalkyl or hydroxyalkyl radical containing from 1 to 4 carbon atoms such as N-aminoethylpiperazine, N-aminopropylpiperazine, 1-(N-betahydroxyethyl-4-piperidyl)-3-(4-piperidyl)propane and the like. N-aminoethylpiperazine is an especially useful diamine employed in conjunction with piperazine.

The polymeric fat acid/piperazine/adipic acid resins generally have an acid value between about 1 and 25, a viscosity at 190° C. between about 100 and 300 poise, softening points greater than 125° C., most often ranging between about 135° C. and 160° C., and a good balance of physical properties (tensile and elongation). The resins also have excellent adhesion to vinyl substrates. This combination of physical properties and ability to adhere vinyl-based materials makes the resins useful in automotive applications for hot melt bonding door panels and crash pads and for the production of shoes, boots and purses made from synthetic patent leather. The resins, in addition to having excellent and unexpected adhesion to vinyl-based polymers, are also useful adhesives for natural or synthetic rubber, leather, suede, poromeric materials and other synthetic polymers, wood, metal, glass, ceramic and the like.

The useful polyamide resins of the present invention which contain adipic acid cannot be obtained employing conventional reaction methods wherein a unit charge of the amine and carboxylic compounds are reacted, typically in proportions such that there is about 1 equivalent of amine for each equivalent of carboxyl in the reaction mixture. When such a unit charge of polymeric fat acid, piperazine and adipic acid are employed large amounts of insoluble salts are formed while the reactants are being heated to reaction temperature which render the resulting resin useless as hot melt adhesives. While other short chain dibasic acid may be reacted in the conventional manner without insoluble salt formation, the resins are not suitable for hot melt bonding vinyl substrates. It is completely unexpected, first that employing a particular reaction technique insoluble salt formation can be avoided with adipic acid and second, that the resulting adipic acid-modified resins would have unique properties making them useful for hot melt bonding of vinyl materials.

It is an essential aspect of the present invention, if resins having properties making them suitable for hot melt bonding of vinyl substrates are to be obtained, that the adipic acid not be added to the reactor with unreacted piperazine. This precludes the use of unit charge procedures. Either the adipic acid or the piperazine are pre-reacted, at least partially, with the polymeric fat acid prior to the addition of the other component. Preferably, adipic acid will be added to the partially reacted mixture of polymeric fat acid and piperazine or if an amine-containing compound such as N-aminoethylpiperazine is to be included the piperazine may be added to a mixture of the polymeric fat acid, adipic acid and N-aminoethylpiperazine which has been exposed to reaction conditions for a suitable period of time. The addition of either the adipic acid or piperazine components must be delayed if insoluble salt formation is to be avoided and useful resins obtained.

The polyamide resins are prepared by heating the reactants at a temperature between about 100° C. and 300° C. The preferred procedure for conducting the present process is to heat the polymeric fat acid and piperazine in the reactor at about 140 to 200° C. until the theoretical amount of water based on the fat acid charge is evolved, generally from 0.5 to 2 hours. The adipic acid is then slowly added to the reactor. During the addition of the adipic acid the reaction temperature may be increased to about 240° C. or higher if desired. Reaction times from about 2 to 24 hours may be employed, however, acceptable resins are generally obtained after about 8 hours total reaction time. If desired a vacuum may be applied at any stage of the reaction to facilitate removal of any volatile materials formed.

The following examples serve to illustrate the invention more fully, however, they are not intended as a limitation on the scope thereof. All parts and percentages are on a weight basis unless otherwise indicated.

Example I

In accordance with the present invention a polymeric fat acid/adipic acid/piperazine resin was prepared as follows:

To a glass reactor equipped with a stirrer, nitrogen inlet, thermometer and condenser fitted with a water trap were charged 274.6 grams (0.8 equivalent) of Empol 1010 dimer acid (a hydrogenated polymerized fatty acid consisting of 97% $C_{36}$ dibasic acid) and 52.8 grams (1 equivalent) piperazine. The reactor and its contents were slowly heated with agitation to 225° C. with a nitrogen purge and maintained at this temperature for 10 minutes after which time 17.5 grams (0.20 equivalent) adipic acid was added. The temperature was raised to 250° C. and held for 2 hours. An additional amount (2.5 grams) of piperazine and 11.4 grams of the polymeric fat acid were then charged and a vacuum (30 torr) pulled on the system. After 3½ hours (total reaction time at 250° C.), the clear, salt-free resin sample which had an acid value of 10.1 and an amine value of 0.6 was discharged.

When identical amounts of the reactants were combined and added to the reactor as a unit charge and reacted at 250° C. for 2 hours a large amount of insoluble salt was formed in the reactor. The resulting cloudy resin had an acid value of 10.9 with an amine value of 1.4. The insoluble salts could not be removed by filtration due to the viscosity of the resin mass and the resin could not be used for hot melt bonding vinyl substrates while the salts were present.

Example II

Employing a delayed addition procedure similar to that described in Example I but conducted in a 50 gallon resin reactor, 200.2 lbs. (0.70 equivalent) Empol 1010 dimer acid, 32.2 lbs. (0.75 equivalent) piperazine and 12.6 lbs. (0.20 equivalent) aminoethylpiperazine were charged to a reactor and heated to 200° C. for 1 hour. The reaction mixture was then cooled to 140° C. and 22.2 lbs. (0.30 equivalent) adipic acid charged followed by additional heating at 225° C. under a nitrogen atmosphere until the reaction mass had a viscosity of about 150 poise (measured with a Brookfield LVF viscometer at 190° C., No. 4 spindle, 60 r.p.m.). At this point heating was terminated and the resin, acid value of 3.9, discharged from the reactor.

Example III

Following the procedure described in Example II, 0.40 equivalent Empol 1010, 0.55 equivalent piperazine, 0.30 equivalent Emerox 1144 azelaic acid (92% azelaic acid), 0.40 equivalent aminoethylpiperazine, and 0.30 equivalent adipic acid were reacted. The adipic acid was charged to the reactor after the other reactants had been prereacted for approximately one hour. The resultant highly viscous resin, acid value 4.2, was clear and contained no trace of insoluble salts.

Example IV

Various physical properties of the polyamide compositions prepared in Examples I–III were measured and are reported below. These properties which include tensile strength, elongation, viscosity and softening point are generally considered as the most significant physical characteristics when evaluating the effectiveness of polyamides for hot melt adhesive applications. Also, to demonstrate the utility of the present resins as adhesives for vinyl materials, a vinyl laminate was prepared and the peel strength recorded. Tensile strength (p.s.i.) and elongation (percent) were measured in the conventional manner with an Instron tensile tester. Viscosities (poise) were determined on the resin at 190° C. with a Brookfield LVF viscometer using a No. 4 spindle at 60 r.p.m. Softening points (° C.) were measured using the ring and ball method with a temperature increase of 5° C. per minute. The peel strength (180° pull) was measured with an Instron tensile tester. Vinyl laminates were prepared by melting the resin sample on a steel plate and adhering milled vinyl sheet thereto by cooling to room temperature while applying pressure.

The test results were as follows:

| Example Number | I | II | III |
|---|---|---|---|
| Tensile strength | 300 | 400 | 1,700 |
| Elongation | 200 | 500 | 380 |
| Softening point | 131 | 137 | 132 |
| Viscosity | 44.2 | 161 | 329 |
| Vinyl peel (lbs.) | 23 | 56 | 55 |

The above data clearly indicate the superior softening points obtained with the resins prepared from polymeric fat acid, piperazine and adipic acid in accordance with the process of the present invention. Softening points greater than 125° C. were observed in all instances and excellent vinyl adhesion was obtained. Furthermore, it is observed that the resins were all free of objectionable insoluble salts such as obtained when adipic acid is reacted with polymeric fat acid and piperazine employing conventional unit charge reaction procedures.

Examples V–VIII

To demonstrate the versatility of the resins obtainable, polymeric fat acid compositions with varying amounts of dimer acid were reacted following the procedure of Example I and in accordance with the following recipes:

| Example Number | V | VI | VII | VIII |
|---|---|---|---|---|
| Reactants (equivalents): | | | | |
| Adipic acid | 0.30 | 0.35 | 0.30 | 0.30 |
| Piperazine | 0.75 | 0.60 | 0.70 | 0.70 |
| Aminoethylpiperazine | 0.20 | 0.25 | 0.25 | 0.25 |
| Oleic acid | | | | 0.05 |
| Empol 1014 dimer acid [1] | | | | .70 |
| Empol 1016 dimer acid [2] | | | 0.65 | |
| Empol 1018 dimer acid [3] | | 0.65 | | |
| Empol 3669 dimer acid [4] | 0.70 | | | |

[1] 95% $C_{36}$ dibasic acid, about 4% $C_{54}$ tribasic acid.
[2] 87% $C_{36}$ dibasic acid, 13% $C_{54}$ tribasic acid.
[3] 83% $C_{36}$ dibasic acid, 17% $C_{54}$ tribasic acid.
[4] 70% $C_{36}$ dibasic acid, about 25% $C_{54}$ tribasic acid.

The resulting resins were free of insoluble salts and had acid values ranging from about 5 to about 15. The physical properties of the resin Samples V and VIII and the peel strengths of vinyl laminates prepared with these resins were measured in accordance with the previous procedures and are as follows:

| Example Number | V | VIII |
|---|---|---|
| Tensile strength | 310 | 475 |
| Elongation | 320 | 290 |
| Softening point | 147 | 149 |
| Viscosity | 110 | 197 |
| Vinyl peel | 25 | 48 |

Softening points of the resins VI and VII were 138° C. and 147° C., respectively.

Example IX

The unique ability of adipic acid to yield useful polyamide resins for hot melt applications is pointed out by the following comparative preparations. Employing the delayed addition technique described in Example I eight resin samples (identified as A–H) were prepared by prereacting 0.70 equivalent Empol 1010 dimer acid, 0.65 equivalent piperazine and 0.30 equivalent aminoethyl piperazine. When the theoretical amount of water (calculated for complete reaction of the fat acid) was evolved, 0.30 equivalent of the following short-chain dibasic acids was charged and allowed to react under identical conditions:

Sample:                           Acid
A                                Oxalic.
B                                Succinic.
C                                Glutaric.
D                                Adipic.
E                                Azelaic.
F                                Sebacic.
G                                Brassylic.
H                                Dodecanedioic.

Viscosity and softening point for each of the resin samples are listed below:

| Sample | Viscosity (190° C.) | Softening point |
|---|---|---|
| A | Decomposed | Decomposed |
| B | 9.2 | 115 |
| C | 35 | 63 |
| D | 161 | 137 |
| E | 168 | 74 |
| F | 153 | 82 |
| G | 227 | 72 |
| H | 137 | 52 |

It is readily seen from the above data that only with adipic acid will a resin having both a suitable softening point (greater than 125° C.) and viscosity making it useful for hot melt applications be obtained. When preparation of the above samples was repeated combining the reactants as a unit charge, the resins produced for Samples A–C and E–H did not differ appreciably from those obtained employing the delayed addition technique. With Sample D (adipic acid), however, an excessive amount of insoluble salt was formed in the reactor.

Examples X–XIII

Additional polyamide compositions were prepared employing the delayed addition technique with varying amounts of reactants and the physical properties of the resins evaluated. Recipes employed and test results were as follows:

| Example Number | X | XI | XII | XIII |
|---|---|---|---|---|
| Empol 1010 | 0.70 | 0.70 | 0.75 | 0.70 |
| Piperazine | 0.55 | 0.65 | 0.70 | 0.80 |
| Adipic acid | 0.30 | 0.30 | 0.25 | 0.30 |
| Aminoethylpiperazine | 0.40 | 0.30 | 0.25 | 0.20 |
| Acid value | 11.4 | 3.9 | 9.2 | 9.5 |
| Viscosity (190° C.) | 180 | 161 | 266 | 194 |
| Softening point (° C.) | 145 | 137 | 140 | 150 |
| Tensile (p.s.i.) | 425 | 400 | 1175 | 550 |
| Elongation (percent) | 550 | 500 | 375 | 430 |
| Vinyl peel (lbs.) | 25 | 56 | 50 | 43 |

We claim:
1. A polyamide resin composition useful as a hot-melt adhesive for vinyl materials having a softening point greater than 125° C. consisting of the reaction product of:
   (a) about 0.3 to 0.9 equivalent of a polymeric fat acid prepared by polymerizing monocarboxylic acids containing from about 8 to 24 carbon atoms, said polymeric fat acid containing at least 65% by weight dimer acid containing from 22 to 44 carbon atoms;
   (b) about 0.5 to about 1.2 equivalents of a piperazine compound having the structural formula

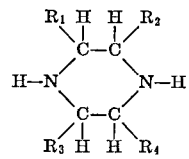

wherein $R_1$, $R_2$, $R_3$ and $R_4$ are independently selected from the group consisting of hydrogen and alkyl groups having from 1 to 4 carbon atoms; and
   (c) from about 0.1 to 0.7 equivalent adipic acid; said components (a) and (b) being prereacted until essentially the theoretical amount of water has been recovered before charging the adipic acid and continuing the reaction to an acid value between about 1 and 25.

2. The polyamide resin composition of claim 1 wherein the prereaction of (a) and (b) is conducted at a temperature in the range 140 to 200° C. and after the adipic charge the reaction is maintained at a temperature from about 140 to 240° C.

3. The polyamide resin composition of claim 1 consisting of 0.5 to 0.9 equivalent polymeric fat acid, 0.65 to 1 equivalent piperazine compound and 0.2 to 0.4 equivalent adipic acid.

4. The polyamide resin composition of claim 3 wherein the polymeric fat acid contains at least 90% by weight dimer acid.

5. The polyamide resin composition of claim 4 wherein the dimer acid is a $C_{36}$ dibasic acid and the piperazine compound is piperazine.

6. A polyamide resin composition useful as a hot-melt adhesive for vinyl materials having a softening point greater than 125° C. consisting of the reaction product of:
   (a) about 0.3 to 0.9 equivalent of a polymeric fat acid prepared by polymerizing monocarboxylic acids containing from about 8 to 24 carbon atoms, said polymeric fat acid containing at least 65% by weight dimer acid containing from 22 to 44 carbon atoms;
   (b) about 0.5 to about 1.2 equivalent of a piperazine compound having the structural formula

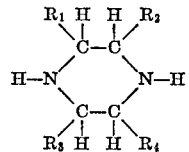

wherein $R_1$, $R_2$, $R_3$ and $R_4$ are independently selected from the group consisting of hydrogen and alkyl groups having from 1 to 4 carbon atoms;
   (c) from about 0.1 to 0.7 equivalent adipic acid; and
   (d) less than about 0.5 equivalent of one or more other amine- or carboxyl-containing compounds selected from the group consisting of aliphatic or aromatic dicarboxylic acids containing up to about 20 carbon atoms, monocarboxylic acids containing up to about 18 carbon atoms and N-substituted piperazine or dipiperidyl type diamines wherein the substituent consists of an aminoalkyl radical containing from 1 to 4 carbon atoms;

said components (a) and (b) being prereacted until essentially the theoretical amount of water has been recovered before the adipic acid is charged and continuing the reaction to an acid value between about 1 and 25.

7. The polyamide resin composition of claim 6 consisting of 0.5 to 0.9 equivalent polymeric fat acid containing at least 90% by weight dimer acid, about 0.65 to 1 equivalent piperazine compound, about 0.2 to 0.4 equivalent adipic acid and less than about 0.3 equivalent of the amine- or carboxyl-containing compound.

8. The polyamide resin composition of claim 7 wherein the dimer acid is a $C_{36}$ dibasic acid, the piperazine compound is piperazine and amine-containing compound is N-aminoethylpiperazine.

References Cited

UNITED STATES PATENTS

| | | | |
|---|---|---|---|
| 3,377,303 | 4/1968 | Peerman et al. | 260—18 |
| 3,499,853 | 10/1970 | Griebsch et al. | 260—18 |
| 3,597,376 | 8/1971 | Tashiro et al. | 260—18 |
| 3,565,837 | 2/1971 | Drawert et al. | 260—18 |

DONALD E. CZAJA, Primary Examiner

E. C. RZUCIDLO, Assistant Examiner

U.S. Cl. X.R.

161—227; 260—404.5